(12) United States Patent  (10) Patent No.: US 7,663,271 B2
Akieda et al.  (45) Date of Patent: Feb. 16, 2010

(54) ACTUATOR WITH HIT PREVENTION MECHANISM

(75) Inventors: Shinichiro Akieda, Shinagawa (JP); Akio Nakamura, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 245 days.

(21) Appl. No.: 11/047,987

(22) Filed: Feb. 2, 2005

(65) Prior Publication Data

US 2005/0168077 A1    Aug. 4, 2005

(30) Foreign Application Priority Data

Feb. 3, 2004  (JP) .............. 2004-026202

(51) Int. Cl.
 *H02K 41/03* (2006.01)
(52) U.S. Cl. .............. 310/12.31; 74/471 XY; 310/12.05
(58) Field of Classification Search .......... 310/12, 310/51, 90.5; 345/156, 184, 147; 74/471 XY
 See application file for complete search history.

(56) References Cited

U.S. PATENT DOCUMENTS 6,326,706 B1 * 12/2001 Zhang .............. 310/12
6,538,348 B2 * 3/2003 Sawai et al. .............. 310/12
6,816,049 B2 * 11/2004 Watanabe et al. .......... 335/222
6,903,468 B2 * 6/2005 Korenaga .............. 310/12
7,336,006 B2 * 2/2008 Watanabe et al. .......... 310/12
2005/0168077 A1 * 8/2005 Akieda et al. .............. 310/12

FOREIGN PATENT DOCUMENTS

JP    60096171    *  5/1985
JP    10-117470       5/1998

* cited by examiner

*Primary Examiner*—Karl I Tamai
(74) *Attorney, Agent, or Firm*—Staas & Halsey LLP

(57) ABSTRACT

An actuator including magnets arranged on a plane on a plane, coils respectively arranged to face the magnets and move relatively with facing the magnets when a current is applied thereto, a moving member connected to either the magnets or coils, a guide member that guides the moving member to move in a given two-dimensional range; and a hit prevention mechanism to prevent the moving member from hitting a movable limit in the given two-dimensional range. The hit prevention mechanism is provided at the movable limit (edge) in the two-dimensional range. It is thus possible to prevent the moving member from hitting the movable limit. This can prevent damage or any hitting sound. The actuator can be used in a comfortable manner and stably for a long period.

4 Claims, 13 Drawing Sheets

FIG. 5B
FIG. 5A
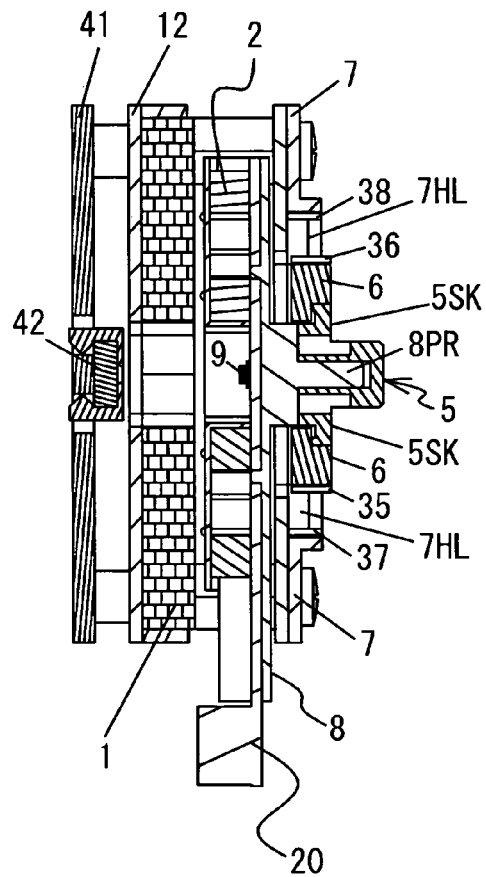
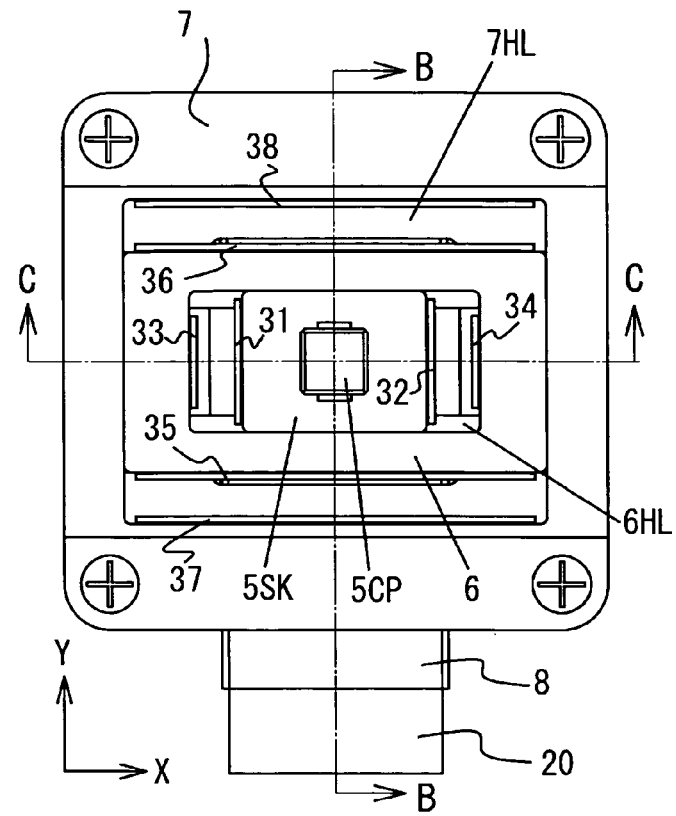
FIG. 5C
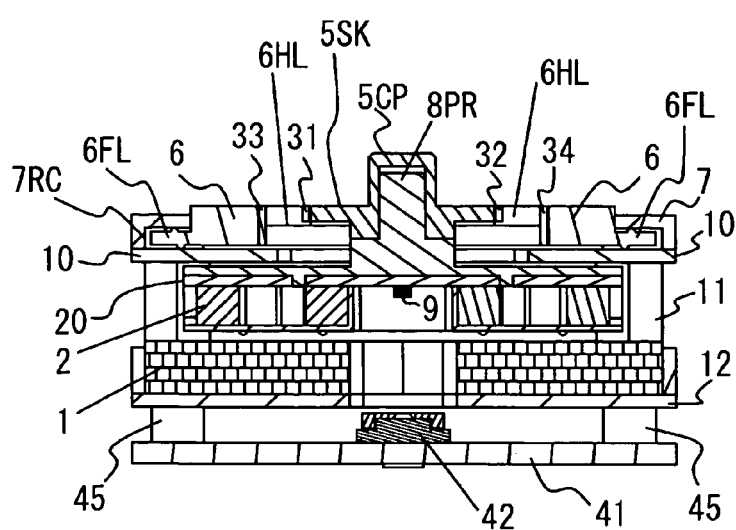

(SIDE VIEW)　　　(PLAIN VIEW)

ACTUATOR WITH HIT PREVENTION MECHANISM

BACKGROUND OF THE INVENTION

1. Field of the Invention

This invention generally relates to an actuator incorporated into a mouse or the like and used for, for example, a personal computer, and more particularly, to an actuator having a portion that moves on a plane with magnetic attraction.

2. Description of the Related Art

Conventionally, small-sized actuators including a portion that moves on a plane with magnetic attraction have been proposed. These actuators are expected to be a new type of device to transmit various pieces of information to an operator from a computer. For instance, the above-mentioned actuator can be incorporated into a mouse widely used with the personal computer. With respect to the mouse, the mouse has conventionally been used as an input device from the operator to the computer. However, in the case where the above-mentioned actuator is incorporated into the mouse, a signal emitted from the computer can be transmitted to the operator. That is to say, the conventional mouse can be utilized as one of machine-man interfaces.

Japanese Patent Application Publication No. 10-117470 (hereinafter referred to as Document 1) discloses a small-sized actuator that moves on the plane. This actuator includes a coil body and a magnet body. The coil body is composed of a large and small loop-shaped coils arranged on the plane. The magnet body is composed of four permanent magnets secured to a base plate and generates a magnetic flux to interlink with the respective loop-shaped coils. This actuator keeps the coil body and the magnet body in a parallel state, controls a relative movement, and moves the coil body or the magnet body on the plane with the use of the thrust force generated when the loop-shaped coils are conducted.

Document 1 discloses the actuator that moves the coil body or the magnet body on the plane. However, sufficient studies have not been conducted yet so that the user can use the actuator in a comfortable manner. This type of actuator is downsized and incorporated into an input device such as a mouse or controller. When the mouse is used, the current passes through the coil and moves the coil or magnet. If a movable range is set in advance, the input device might hit a movable limit (an edge of the movable range). The above-mentioned hitting might cause damage to the actuator, or a hitting sound will be unpleasant to hear. In addition, the actuator described in Document 1 does not have a function of returning to the original position after moving around. Therefore, if the current to the coil is cut off after the coil or magnet moves, the position of the actuator remains different from the original one. As described, the conventional actuator has drawbacks when the input device hits or returns to the original position, and it was not possible to use the input device having the conventional actuator in a comfortable manner.

Further, Document 1 discloses a type of actuator that moves on the plane only. With regard to the actuator incorporated into the mouse or the like, it is preferable to configure the mouse or the like multifunctionally in order to transmit as much information as possible. However, Document 1 does not describe this point.

SUMMARY OF THE INVENTION

It is a general object of the present invention to provide an actuator that moves on a plane so that users can use the actuator in a stable and comfortable manner.

A more specific object of the present invention is to provide the actuator that moves on the plane and has multifunctionality.

According to an aspect of the present invention, preferably, there is provided an actuator including magnets arranged on a plane on a plane, coils respectively arranged to face the magnets and move relatively with facing the magnets when a current is applied thereto, a moving member connected to either the magnets or coils, a guide member that guides the moving member to move in a given two-dimensional range; and a hit prevention mechanism to prevent the moving member from hitting a movable limit in the given two-dimensional range.

In accordance with the present invention, the hit prevention mechanism is provided at the movable limit (edge) in the two-dimensional range. It is thus possible to prevent the moving member from hitting the movable limit. This can prevent damage or any hitting sound. The actuator can be used in a comfortable manner and stably for a long period.

On the above-mentioned actuator, preferably, the hit prevention mechanism comprises at least a pair of magnets that generate a magnetic repulsive force when coming close to each other, the hit prevention mechanism being arranged to face the moving member and the movable limit. The guide member may guide the moving member in first and second axial directions perpendicular to each other, and the hit prevention mechanism is provided for each of the first and second axial directions. The guide member may guide the moving member in first and second axial directions perpendicular to each other, and the hit prevention mechanism is provided in a direction different from the first and second axial directions. The moving member may include a moving piece touched by an operator and engaged with the guide member.

According to another aspect of the present invention, preferably, there is provided an actuator including magnets arranged on a plane, coils respectively arranged to face the magnets and move relatively with facing the magnets when a current is applied thereto, a moving member connected to either the magnets or the coils, a guide member that guides the moving member to move in a given two-dimensional range, and a return mechanism making the moving member return to an original position in the given two-dimensional range.

On the above-mentioned actuator, preferably, the return mechanism includes a spring member making the moving member return to the original position. The return mechanism may include a magnetic member making the moving member return to the original position. The magnetic member may include magnets that are respectively arranged to face the moving member and the guide member to generate magnetic repulsive forces and serve as a hit prevention mechanism.

According to still another aspect of the present invention, preferably, there is provided an actuator including magnets arranged on a plane, coils arranged to face the magnets and move relatively with facing the magnets when a current is applied thereto, a moving member connected to either the magnets or the coils; and a guide member that guides the moving member to move in a given two-dimensional range, the moving member including a thermal conduction member.

On the above-mentioned actuator, preferably, the moving member includes a moving piece in which the thermal conduction member is provided, the moving piece being formed to be touched by an operator. The actuator may further include a hit prevention mechanism to prevent the moving member from hitting a movable limit in the given two-dimensional range. The actuator may further include a return mechanism to make the moving member return to an original position in the given two-dimensional range. The magnets may comprise permanent magnets or electromagnets.

In accordance with the present invention, it is possible to prevent a moving member from hitting any fixed part while the actuator is being driven. It is thus possible to provide the actuator that moves on a plane freely and that prevents damage or any hitting sound.

BRIEF DESCRIPTION OF THE DRAWINGS

Preferred embodiments of the present invention will be described in detail with reference to the following drawings, wherein:

FIG. 5A is a plain view of the actuator in accordance with a first embodiment of the present invention;

FIG. 5B is a cross-sectional view taken along a line B-B shown in FIG. 5A;

FIG. 5C is a cross-sectional view taken along a line C-C shown in FIG. 5A;

DESCRIPTION OF THE PREFERRED EMBODIMENTS

Figure 1A:
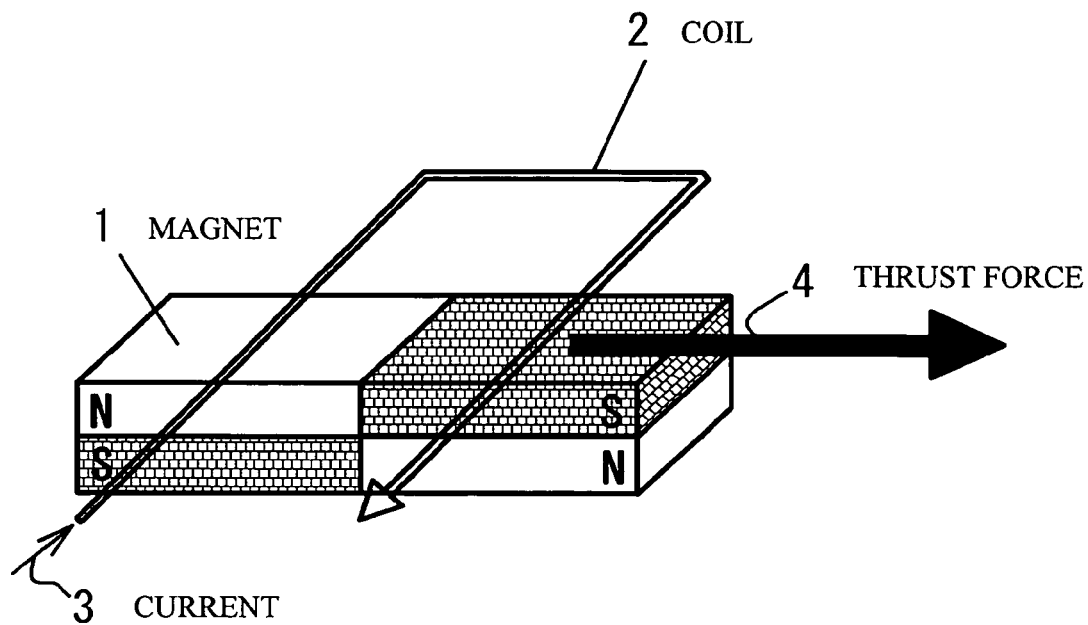
FIG. 1A illustrates Fleming's left-hand rule.

A description will now be given, with reference to the accompanying drawings, of embodiments of the present invention. Before describing the embodiments of the present invention, the basic techniques employed in this invention will schematically be described, with reference to FIGS. 1A and 1B. FIG. 1A illustrates Fleming's left-hand rule. Referring to FIG. 1A, Fleming's left-hand rule is that when a coil 2 is placed close to magnets 1 and a current 3 flows through the coil 2 in the direction of an arrow, a thrust force 4 is generated in the direction of a black arrow.

Figure 1B:
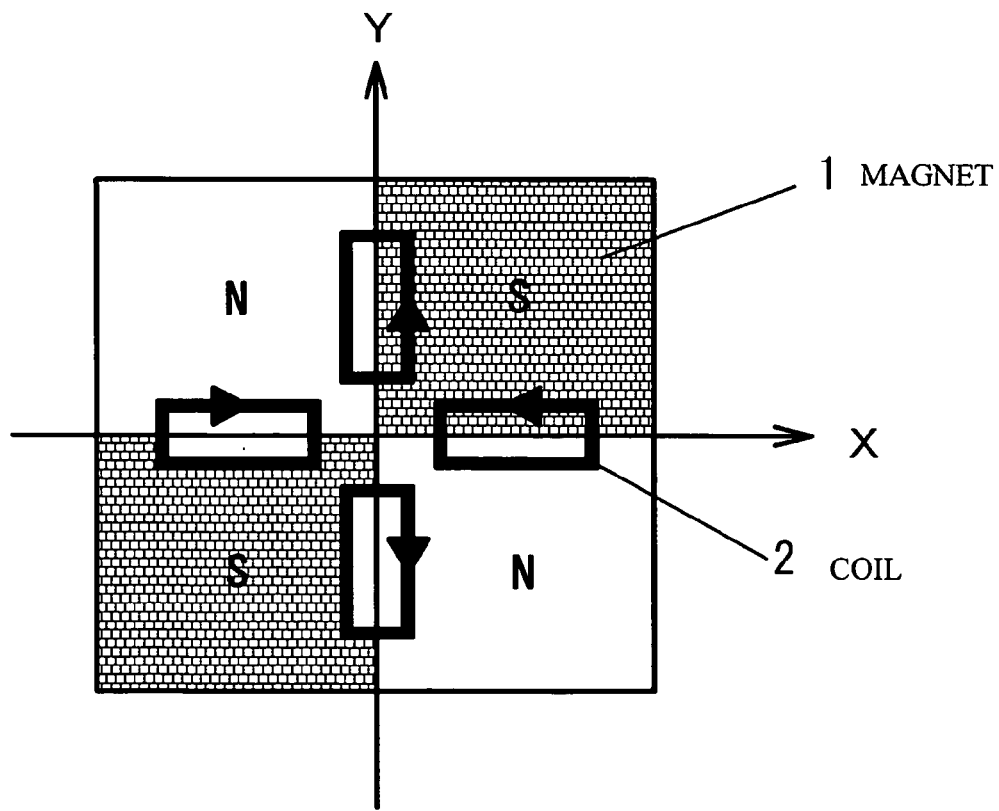
FIG. 1B shows a schematic configuration of a magnet and coil in accordance with the present invention.

FIG. 1B shows a schematic configuration of the magnets and coil in accordance with the present invention. Referring to FIG. 1B, multiple coils (four coils in FIG. 1B) are arranged to face the magnets 1 on a plane, in which north poles and south poles are alternately arranged. The coil 2 is secured to a moving member (not shown) to control the current flowing through the coil 2. According to the thrust force as described in FIG. 1A, it is possible to move the coil 2 in the X-Y dimension, namely, two dimensions. The present invention relates to an actuator that moves on a plane with the use of the above-mentioned configuration.

Figure 2A:
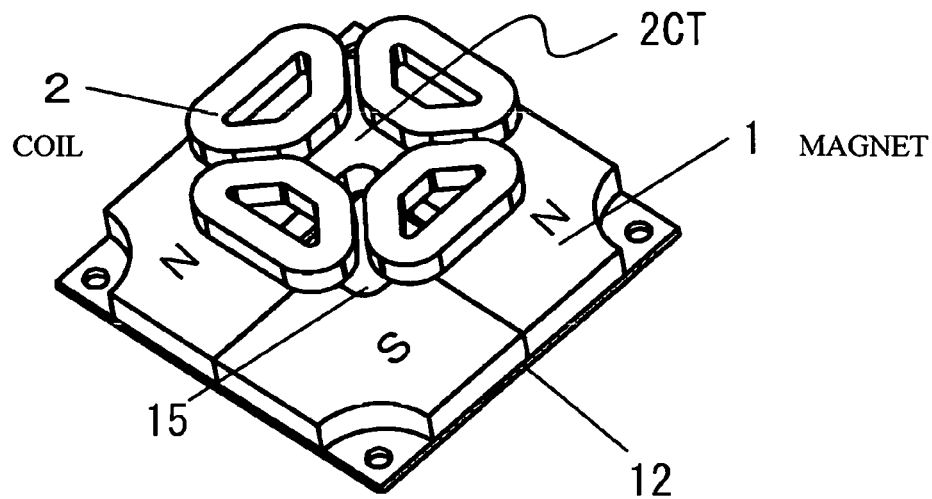
FIGS. 2A through 2C precisely illustrate the configuration of FIG. 1B.
Figure 2B:
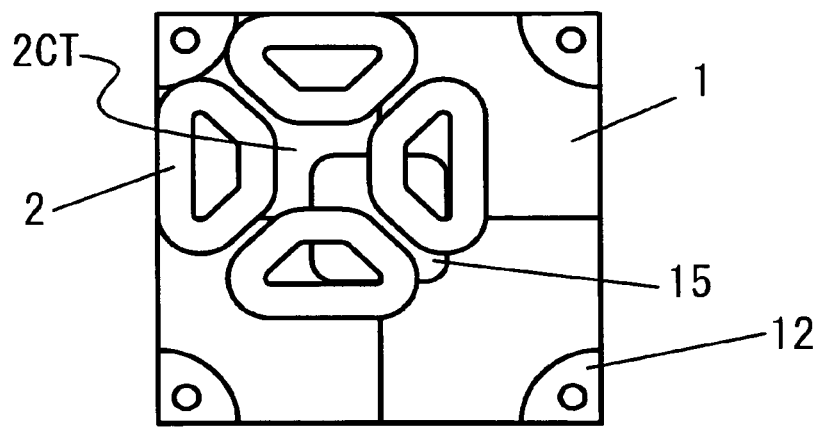
Figure 2C:
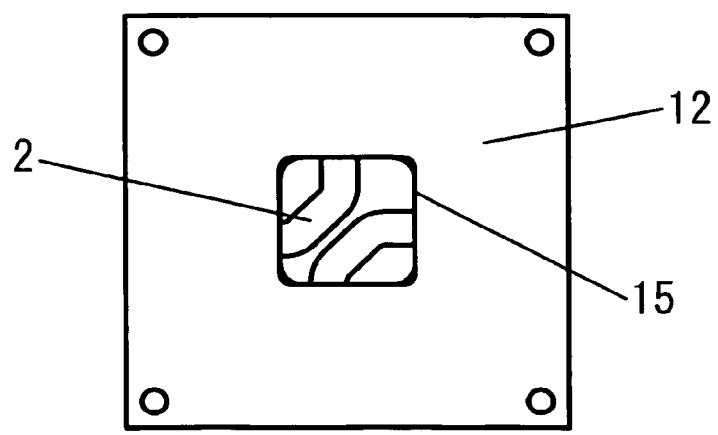

FIGS. 2A through 2C precisely illustrate the configuration of FIG. 1B. FIG. 2A is a perspective view of the magnets 1 and the coil 2. FIG. 2B is a plain view. FIG. 2C is a bottom view. Referring to FIGS. 2A through 2C, the magnets 1 is secured on a substrate 12. The coil 2 is arranged to face the magnets 1 provided on a plane. When the current flowing through the coil 2 is controlled, the coil 2 starts a relative motion with facing the magnets 1. It is thus possible to move the coil 2 in two dimensions (on the plane). Here, an opening 15 is provided on the substrate 12 and is used for detecting an amount of movement. A central portion 2CT is formed to be surrounded by four coils 2. The shape of each coil 2 is shown as an example here so that the central portion 2CT may correspond to the opening 15. The magnets 1 may be either permanent magnets or electromagnets. The coil 2 may be secured so that the magnets 1 may move around. In the embodiments described later, the magnets 1 are secured and the coil 2 moves around.

Figure 3:
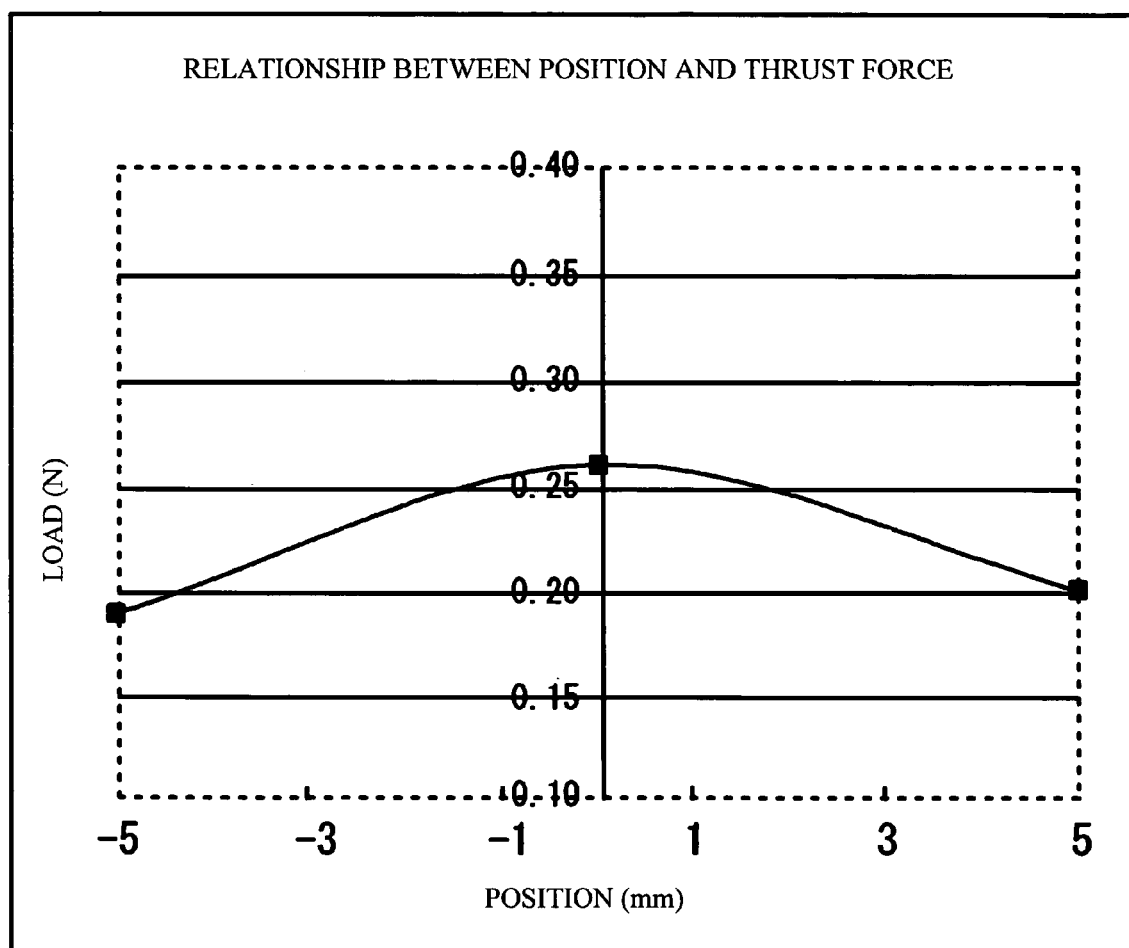
FIG. 3 shows a relationship between positions of the coil and the thrust force (load N) in X and Y directions shown in FIG. 1B.

FIG. 3 shows a relationship between positions of the coil and the thrust force (load N) in X and Y directions shown in FIG. 1B. The horizontal axis denotes amount of movement (mm) of coil position, and the vertical axis denotes the load N generated on the coil. Here, an example is shown in the case where a 200 mA current flows through the coil and 12000 Gauss magnets are used. The middle position in FIG. 3 denotes a borderline between N-pole and S-pole of the magnets 1 on which the coil 2 lies. The largest load N is generated on the middle position, and it is possible to confirm a sufficient load N on another position, which is +−5 mm apart from the middle position. A description will be given of the embodiments of the present invention, with reference to the drawings.

First Embodiment

Figure 4:
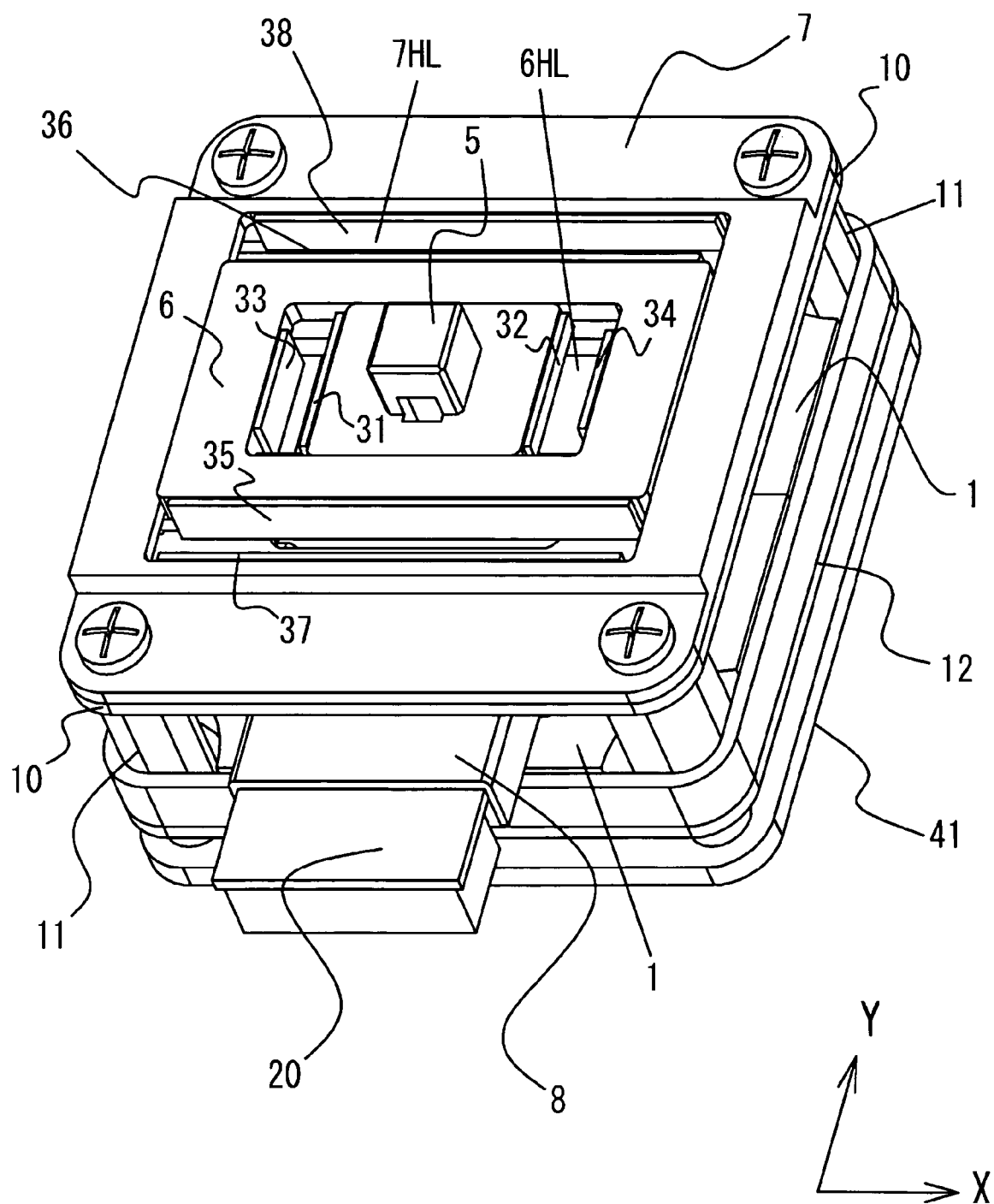
FIG. 4 is a perspective view of an actuator in accordance with a first embodiment of the present invention.

FIG. 4 is a perspective view of an actuator in accordance with a first embodiment of the present invention. FIG. 5A is a plain view of the actuator in accordance with the first embodiment of the present invention. FIG. 5B is a cross-sectional view taken along a line B-B shown in FIG. 5A. FIG. 5C is a cross-sectional view taken along a line C-C shown in FIG. 5A. The actuator in accordance with the first embodiment of the present invention is one part and is incorporated into a mouse, for example. This will be described later in detail.

Referring to FIGS. 4 and 5A through 5C, the actuator is provided on the substrate 12. The magnets 1 arranged on the substrate 12 on the plane. The magnets 1 include magnetic poles, which are alternately arranged on the substrate 12 (See FIG. 2A). A supporting plate 10 is provided above the substrate 12 via a spacer 11. A moving mechanism is provided on the supporting plate 10 to move the coil 2 in two dimensions (on the plane).

FIG. 4 partially shows a slider 20 included in a moving member. The slider 20 is shown in FIGS. 5B and 5C. The slider 20 holds the coil 2 on a bottom face. A moving board 8 is secured on a top face of the slider 20. The moving board 8 has a protruding portion 8PR in the center. A moving piece 5 is arranged to cover an upper part of the protruding portion 8PR. The moving piece 5 includes a head portion 5CP and a flange portion 5SK. The head portion 5CP covers the protruding portion 8PR. The flange portion 5SK extends outwards in the lower part of the head portion 5CP. The moving board 8 and the moving piece 5 are secured on the slider 20 and move integrally. That is to say, the moving member includes the above-mentioned three members in accordance with the first embodiment of the present invention. The moving piece 5 is arranged, corresponding to the central portion 2CT of the coil 2 secured to the bottom face of the slider 20 (See FIG. 2).

Figure 6A:
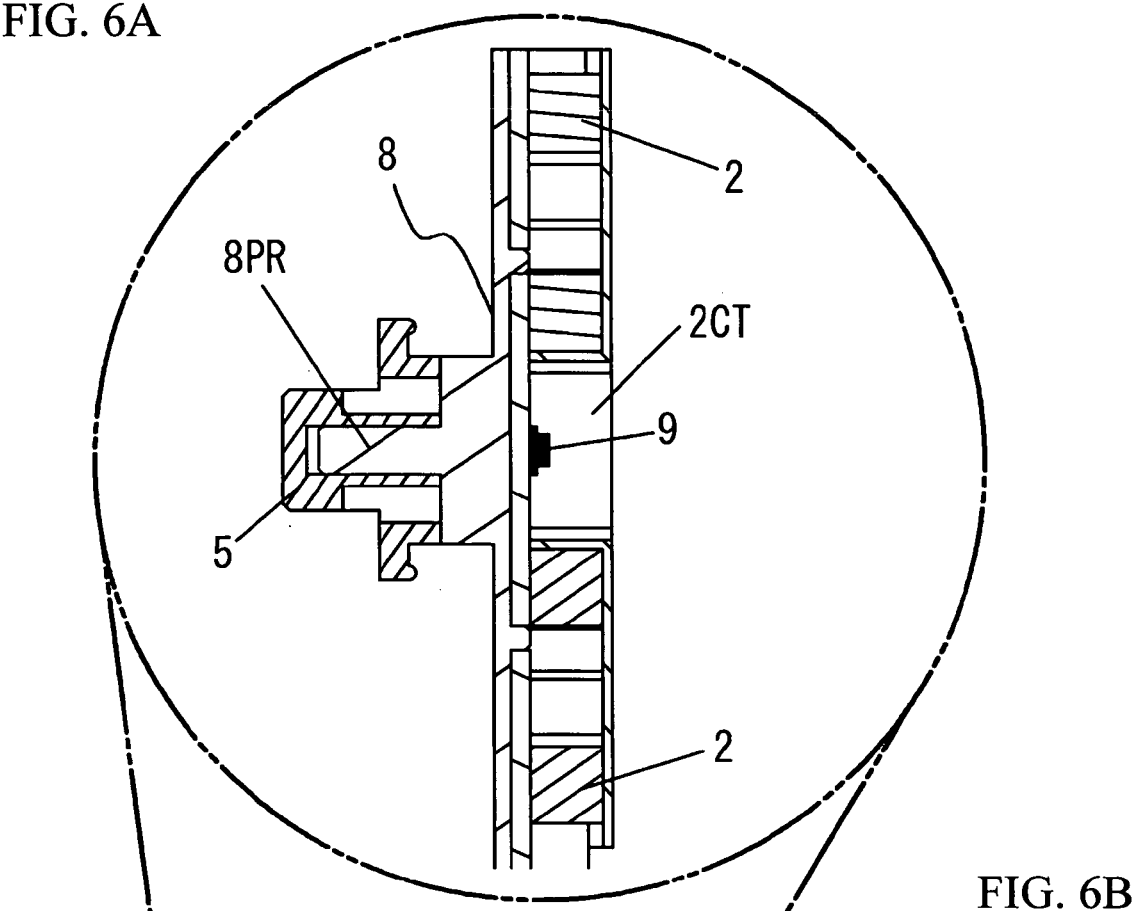
FIG. 6A is a side view of the slider 20 including a magnified view.
Figure 6B:
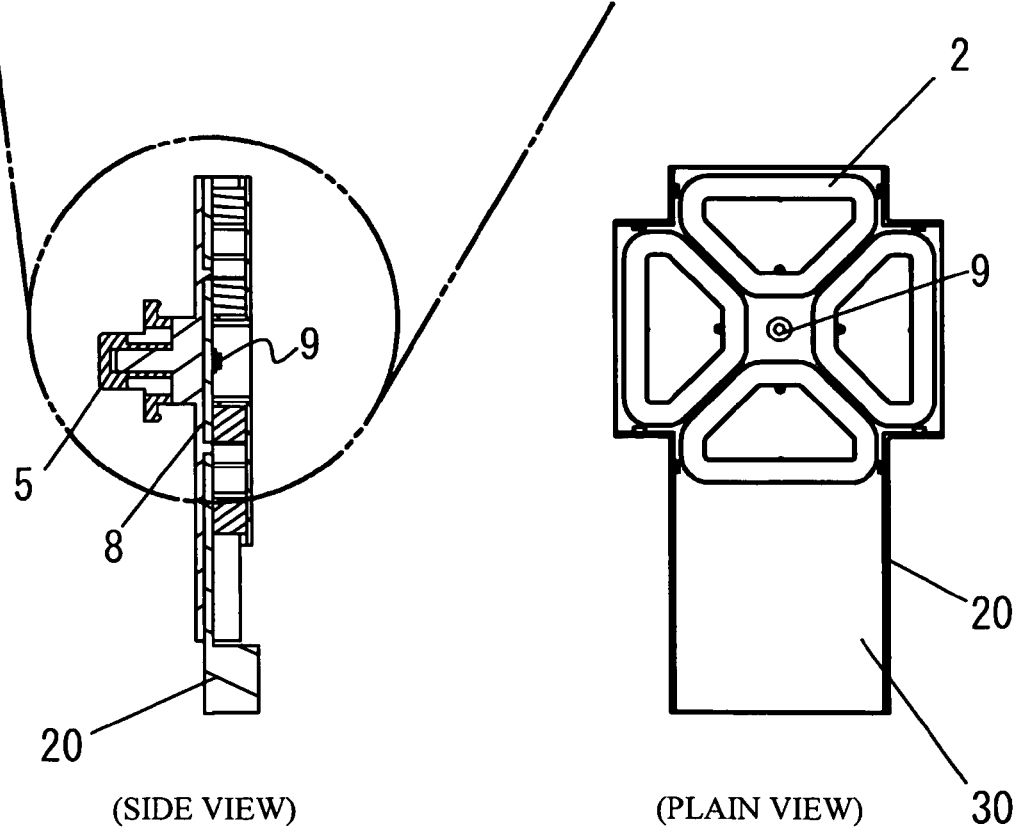
FIG. 6B is a front view of the slider 20.

FIGS. 6A and 6B show the slider 20, the moving board 8, and the moving piece 5 that move integrally. FIG. 6A is a side view of the slider 20 including a magnified view. FIG. 6B is a front view of the slider 20. (FIG. 6B corresponds to a bottom view of FIG. 5A) A circuit board 30 is fit into the slider 20. Electric parts and circuit patterns, not shown, are arranged on the circuit board 30. The coil 2 is secured to the slider 2 through the circuit board 30. The moving piece 5 is secured on a back surface of the slider 20 via the moving board 8, as described above.

A LED (Light Emitting Diode) is arranged on the circuit board 30 making use of a space in the central portion 2CT arranged in the center of the four coils 2. The LED 9 is used for detecting the position in the case where the actuator is incorporated into the mouse.

Referring back to FIGS. 4 and 5A through 5C, a description will be given of a mechanism of moving the slider 20 in a given range of two dimensions. The given range in the two dimensions is guided by engaging the moving piece 5 that moves integrally with the slider 20 into a guide member, on the actuator in accordance with the first embodiment of the present invention. The movable range of the moving piece 5 is thus limited, and the movable range of the slider 20 is also limited.

The actuator in accordance with the first embodiment of the present invention includes a first guide member 6 and a second guide member 7 so as to guide the moving piece 5 in the X and Y directions. Referring to FIG. 4, the first guide member 6 is provided to guide the moving piece 5 in the X direction (a first axial direction) in the given range. The first guide member is a substantially rectangle in appearance, and has a rectangular opening 6HL in the center. The moving piece 5 is guided in the opening 6HL.

A description will be given of how the moving piece 5 is guided, with reference to FIGS. 5A through 5C. The protruding portion 8PR of the moving board 8 is arranged in the center of the opening 6HL in the Y direction (a second axial direction) of the first guide member 6. The moving piece 5 is secured on the protruding portion 8PR. The moving piece 5 includes the flange portion 5SK, both sides of which are arranged to slide along an inner surface of the opening 6HL, as shown in FIGS. 5A through 5C. The moving piece 5 thus slides in one direction (the X direction) along the inner surface of the first guide member 6.

In addition, the above-mentioned first guide member 6 is guided to the Y direction, perpendicular to the X direction, by the second guide member 7. The second guide member 7 is also a substantially rectangle in appearance. A rectangular opening 7HL is provided in the center. The first guide member 6 slides in the opening 7HL. With reference to FIG. 5C, a description is given in detail, here. The first guide member 6 has a flange portion 6FL, which protrudes on both sides. The flange portion 6FL is fit into a receive groove 7RC, which is provided on both sides of the opening 7HL. The receiving groove 7RC extends in the Y direction. The first guide member 6 thus slides in on direction (the Y direction) along the inner surface of the second guide member 7.

With the above-mentioned configuration, the moving piece 5 is guided to the X direction by the first guide member 6. Then, the first guide member 6 is guided to the Y direction, perpendicular to the X direction, by the second guide member 7. The moving piece 5 is thus guided and capable of moving freely in the two dimensions when a certain thrust force is applied to the slider 20 having the coil 2 in the actuator.

In the case where the actuator is incorporated into the mouse so that a finger of an operator may touch the moving piece 5, the operator feels the thrust force applied from the coil 2, which is secured to the slider 20. If the slider 20 is moved little by little by controlling the current applied to the coil 2, this makes the operator recognize that the moving piece 5 is vibrating.

It is possible to convey information from the computer to the operator by incorporating the actuator into the mouse as described above. However, mouse devices are used for inputting instructions from operators. Therefore, the actuator in accordance with the present invention is configured to serve as an input device, too. In the case where the actuator is incorporated into the mouse, the operator moves the moving piece 5. When the movement of the moving piece 5 is detected, the detection can be used as an input signal. This is the reason why the LED9 is provided under the moving piece 5, as described.

As shown in FIGS. 5A through 5C, a substrate 41 is secured under the substrate 12 by the spacers 45. A Photodiode Detector (hereinafter simply referred to as PD) 42 is secured in the center of the substrate 41. The PD 42 detects a light emitted from the LED 9, which is provided above the PD 42. The opening 15 is provided in the center of the substrate 12 that supports the magnets 1 (See FIG. 2). The PD 42 is thus capable of detecting the movement of the moving piece 5.

The actuator shown in FIGS. 4 and 5A through 5C is configured to be incorporated into the mouse, as described above. The substrate 41, which is provided at a lowermost part to secure the PD 42 used for position detection, and the spacer 45 may not always configured to be included in the actuator in accordance with the present invention. The same configuration may be substantially realized by providing the PD 42 and the upper part of the actuator, which is above the substrate 12, on a substrate inside the mouse.

The actuator having the above-mentioned configuration in accordance with the first embodiment of the present invention is capable of vibrating, for example, the slider 20 by controlling the current applied to the coil 2. The moving piece 5 and the slider 20 form one unit, and the vibration can be transmitted to the operator through the moving piece 5. It is thus possible to convey various signals from the computer to the operator by incorporating the actuator of the present invention into the mouse connected to the computer. It is also possible to make the actuator of the present invention serve as the input device, by providing the actuator of the present invention together with the LED or the like.

When the moving piece 5 to which the thrust force is applied moves inside the first guide member 6, or the first guide member 6 moves inside the second guide member 7, the moving piece 5 or the first guide member 6, in some cases, hits (strongly contacts) the limit of the movable range (the edge of the guide). This hitting might cause damage to the actuator or make a hitting sound, as described above.

The actuator of the present invention is configured to suppress the above-mentioned hitting. A description will be given in detail. Referring to FIGS. 4 and 5A through 5C, magnets 31 and 32 are secured on both sidewalls of the moving piece 5 in a direction of movement (the X direction). Magnets 33 and 34 are provided on inner walls of the first guide member 6 so as to face the magnets 31 and 32. The magnet 31 provided on the moving piece 5 has the same magnetic pole as the magnet 33 provided on the first guide member 6 (for instance, both magnets have north poles). When the magnet 31 and the magnet 33 come close and face each other, it is configured to generate a repulsive force. In the same manner, the magnet 32 provided on the moving piece 5 is configured to face the magnet 34 provided on the first guide member 6 and have the same magnetic pole. When the moving piece 5 moves together with the slider 20 in the first guide member 6 and reaches the movable limit, the above-mentioned magnets generate the repulsive forces each other. It is thus possible to prevent the moving piece 5 from hitting the inner wall of the first guide member 6.

In addition, magnets 35 and 36 are secured in the direction of movement (the Y direction) on both sidewalls of the first guide member 6. Magnets 37 and 38 are provided on an inner wall of the second guide member 7 so as to face the magnets 35 and 36. The magnet 35 provided on the first guide member 6 is configured to face and have the same magnetic pole as the magnet 37 provided on the second guide member 7. In the same manner, the magnet 36 provided on the first guide member 6 is configured to face and have the same magnetic pole as the magnet 38 provided on the second guide member 7. When the first guide member 6 moves together with the moving piece 5 in the second guide member 7 and reaches the movable limit, the above-mentioned magnets generate the repulsive forces each other. It is thus possible to prevent the first member 6 from hitting the inner wall of the second guide member 7.

As described above, the actuator of the present invention is capable of preventing from the hitting with the use of the above-mentioned hit prevention mechanism. The hit prevention mechanism is configured to arrange the above-mentioned magnets 31 through 38 so as to respectively face the moving piece 5, the first guide member 6, and the second guide member 7 and form pairs. It is thus possible for a user to use the actuator of the present invention in a comfortable manner as compared to the conventional actuators.

Either permanent magnets or electromagnets may be employed in the above-mentioned magnets 31 through 38 arranged for the prevention of hitting. Precisely, multiple combinations are possible. The following three combinations may be employed. (1) Both magnets facing each other are the permanent magnets. (2) One of the magnets is the permanent magnet and the other is the electromagnet. (3) Both magnets facing each other are the electromagnets.

In the case where both magnets facing each other are the permanent magnets as in (1), the permanent magnets are just secured on the sidewalls of the respective members, and so the configuration can be thus simplified. In the above-mentioned case, the thrust force, which is applied to the moving piece 5 from the coil 2 through the slider 20, is measured to employ the permanent magnets, if the permanent magnets can generate a sufficient repulsion force that can prevent the hitting when the magnets come close each other.

In contrast, in the case where the electromagnets are employed as in (2) or (3), the magnetic attraction (magnetic repulsive force) may be increased or decreased appropriately to prevent the hitting by adjusting the current applied to the electromagnets. In the case the electromagnets are employed in at least one of the magnets 31 through 38, one-dimensional (linear) movement can be realized and the moving piece 5 moves in one direction only (either the X or Y direction). For instance, the electromagnets are employed in the magnets 31 through 34 shown in FIG. 4 to enhance the magnetic attraction of the magnets 31 and 33. In the same manner, the magnets 32 and 34 are also enhanced so that the moving piece 5 may keep a balance with pushed from both right and left sides. That is to say, a state of magnetism, in which the moving piece hardly moves to the X direction, is thus generated. In this case, the actuator serves as a one-dimensional actuator and the moving piece 5 moves linearly. In contrast, in the case where the magnets 35 through 38 in the Y direction are configured as described above, the moving piece 5 moves in the Y direction only. As described, the electromagnets may be employed in at least one of the magnets of the pair facing each other so that the moving piece 5 may move in one dimension.

Figure 7:
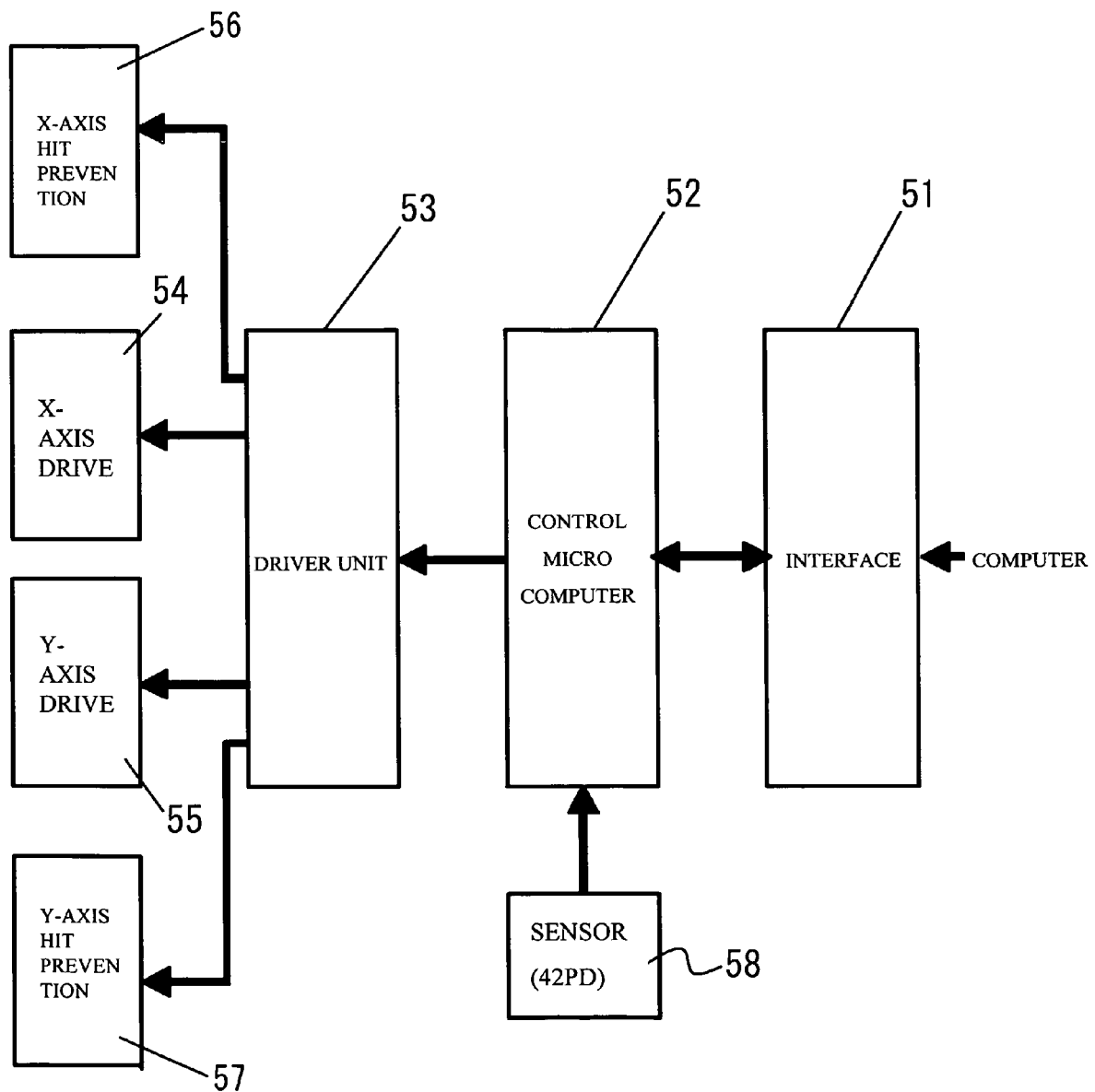
FIG. 7 is a block diagram schematically describing the configuration of the actuator.

FIG. 7 is a block diagram schematically describing the configuration of the actuator. For, example, a control microcomputer unit 52 may correspond to a CPU or the like arranged on the substrate 30 shown in FIG. 6B. The control microcomputer unit 52 controls the current applied to the coil 2. The control microcomputer unit 52 is connected to an external computer or the like by way of an interface unit 51. The control microcomputer unit 52 applies drive signals to a driver unit 53, according to the signals inputted from the computer. The driver unit 53 thus adjusts the current applied to an X-axis drive unit 54 and a Y-axis drive unit 55. Here, the X-axis drive unit 54 and a Y-axis drive unit 55 correspond to the coil 2. It is thus possible to make the slider 20 move in a desirable manner, by controlling the current applied from the control microcomputer unit 52 to the X-axis drive unit 54 and the Y-axis drive unit 55. As a result, the moving piece 5 moves together with the slider 20 and vibrates, and the movement of the moving piece 5 is capable of conveying various pieces of information to the operator. In the case where the actuator of the present invention is incorporated into a device such as the mouse or the like, the CPU provided on the device may serve as the control microcomputer 52.

The electromagnets may be employed to prevent the hitting as described above. In the case where the electromagnets are employed, the driver unit 53 may drive the above-mentioned hit prevention mechanism, in the same manner as the coil 2. That is, the control microcomputer unit 52 is capable of controlling to drive the electromagnets and prevent the hitting. Referring to FIG. 7, the driver unit 53 is connected to a first hit prevention unit 56 on the X-axis and a second hit prevention unit 57 on the Y-axis. In this case, the first hit prevention unit 56 on the X-axis corresponds to the electromagnets arranged on the X-axis, and the second hit prevention unit 57 on the Y-axis corresponds to the electromagnets arranged on the Y-axis (See FIG. 4). In the case where the actuator of the present invention is incorporated into the mouse, as described above, the mouse is configured to serve as the input device, too. In this case, the operator moves the moving piece 5 with a finger thereof so as to input a position on a display device of the computer system to which the mouse is connected. Then, the LED 9 provided in the center of the coil 2 is lighted, and the PD 42 detects the light. A detection signal detected by a sensor unit including the PD 42 is applied to the above-mentioned control microcomputer unit 52.

Second Embodiment

Figure 8:
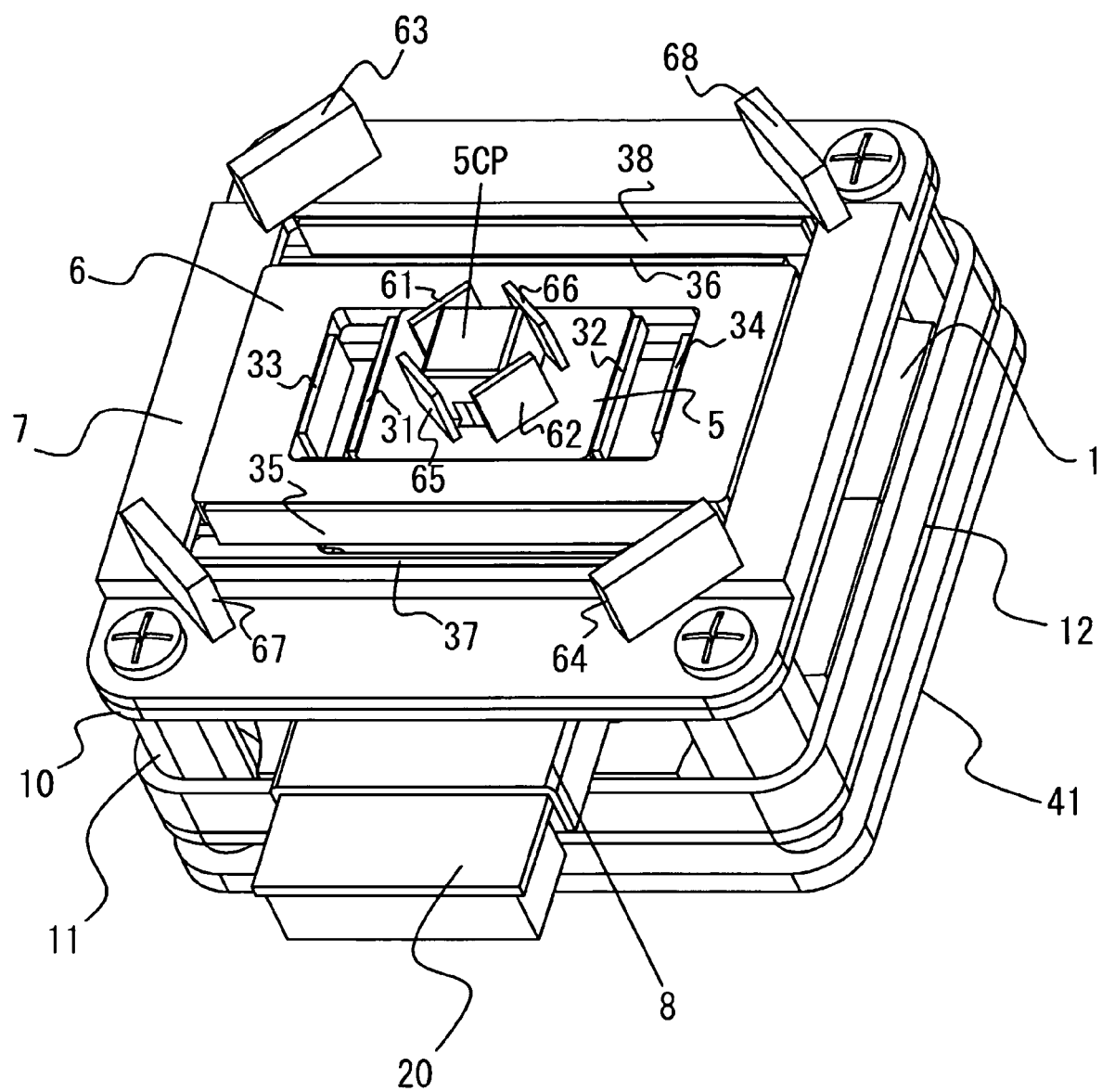
FIG. 8 is a perspective view of an actuator in accordance with a second embodiment of the present invention.
Figure 9:
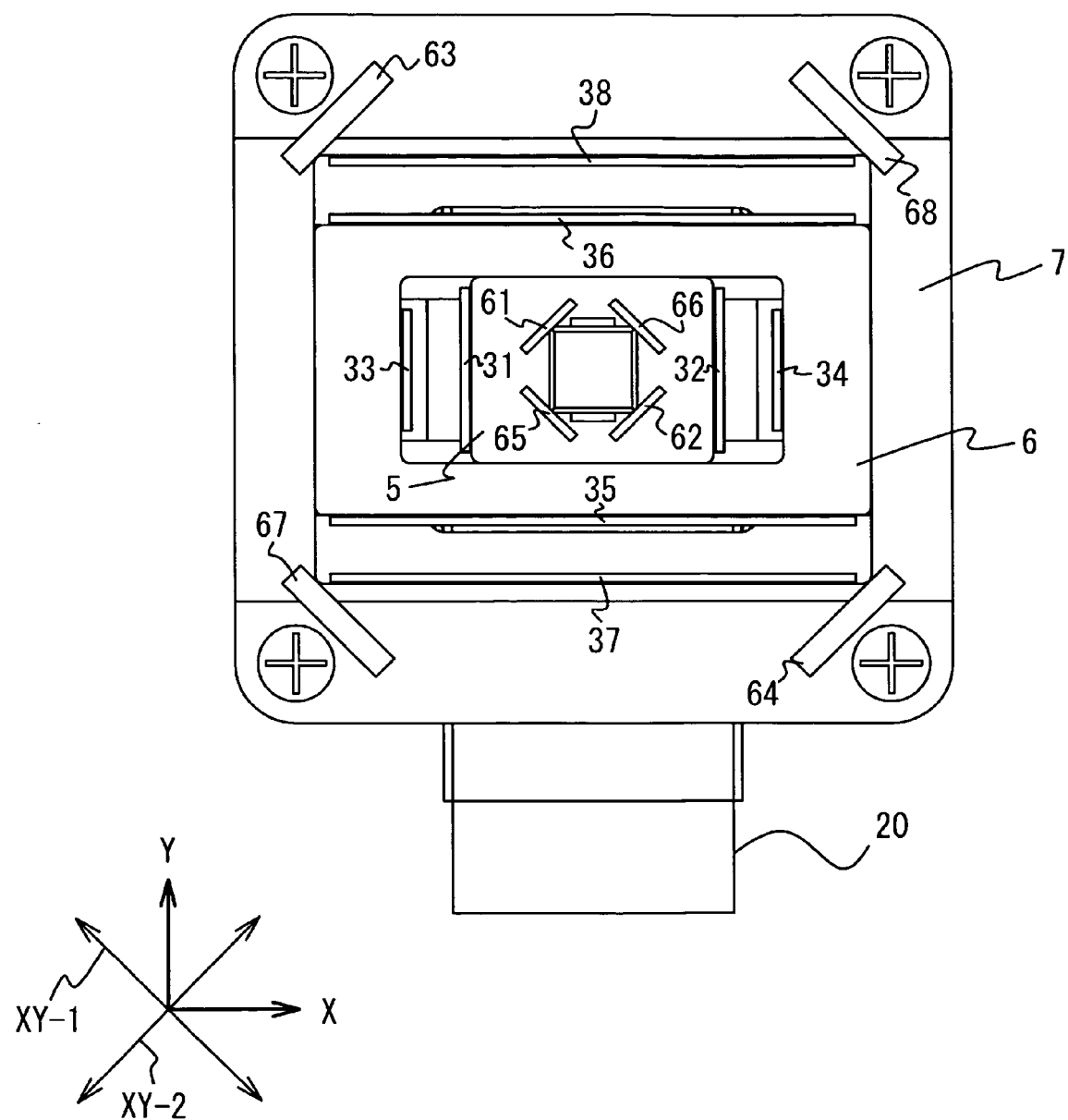
FIG. 9 is a plain view of the actuator in accordance with the second embodiment of the present invention.

FIGS. 8 and 9 show an actuator in accordance with a second embodiment of the present invention. FIG. 8 is a perspective view of an actuator in accordance with the second embodiment of the present invention. FIG. 9 is a plain view of the actuator in accordance with the second embodiment of the present invention. Hereinafter, in the second through fourth embodiments, the same components and configurations as those of the first embodiment have the same reference numerals and a detailed explanation will be omitted.

The actuator, in accordance with the second embodiment of the present invention, further includes magnets, which are arranged at tilt angles (XY-1, XY-2) to the X-axis (a first axis) and the Y-axis (a second axis). The magnets serve as the hit prevention mechanism. The X-axis and the Y-axis are arranged in the direction perpendicular to each other. The actuator, in accordance with the second embodiment of the present invention, also prevents the hitting in the X direction with the magnets 31 through 34 and the hitting in the Y direction with the magnets 35 through 38.

However, the range that the moving piece 5 moves is the plane (two dimensions) combined by the movements to the X direction and Y direction. Therefore, the moving piece 5 also moves toward tilted directions (XY-1, XY-2) to the above-mentioned axes. The magnets 31 through 38, provided for the prevention of the hitting in the respective axial directions, are capable of preventing the hitting when the moving piece 5 moves aslant and reaches the edge (the limit of the movable range). However, it is preferable that the actuator is configured to prevent the hitting more certainly, even if the moving piece 5 moves aslant. An actuator 3, in accordance with the second embodiment of the present invention, includes the magnets facing each other on the tilt angles to the respective axes (the X-axis and Y-axis)

Magnets 61 and 62 are secured on the head portion 5CP of the moving piece 5 at a tilt angle (XY-1), which is rotated 45 degrees clockwise from the X-axis. Magnets 63 and 64 are arranged on the second guide member 7 so as to face the magnets 61 and 62. The magnet 61 provided on the moving piece 5 has the same magnetic pole as the magnet 63 provided on the second guide member 7 so as to generate the repulsive force when the magnets 61 and 63 come close and face each other. In a same manner, the magnet 62 provided on the moving piece 5 has the same magnetic pole as the magnet 64 provided on the second guide member 7, and the magnets 62 and 64 face each other. It is thus possible to surely prevent the hitting at the tilt angle where the repulsive force is generated, when the moving piece 5 moves aslant and reaches the edge.

In a same manner, magnets 65 and 66 are secured on the head portion 5CP of the moving piece 5 at another tilt angle (XY-2), which is rotated 45 degrees clockwise from the Y-axis. Magnets 67 and 68 are arranged on the second guide member 7 so as to face the magnets 65 and 66. Either the permanent magnets or the electromagnets may be employed in the magnets 61 through 68, which are further included in the actuator in accordance with the second embodiment of the present invention. In the case where the electromagnets are employed, the actuator may be connected to the driver unit 53 to control the electromagnets (See FIG. 7).

Third Embodiment

Figure 10:
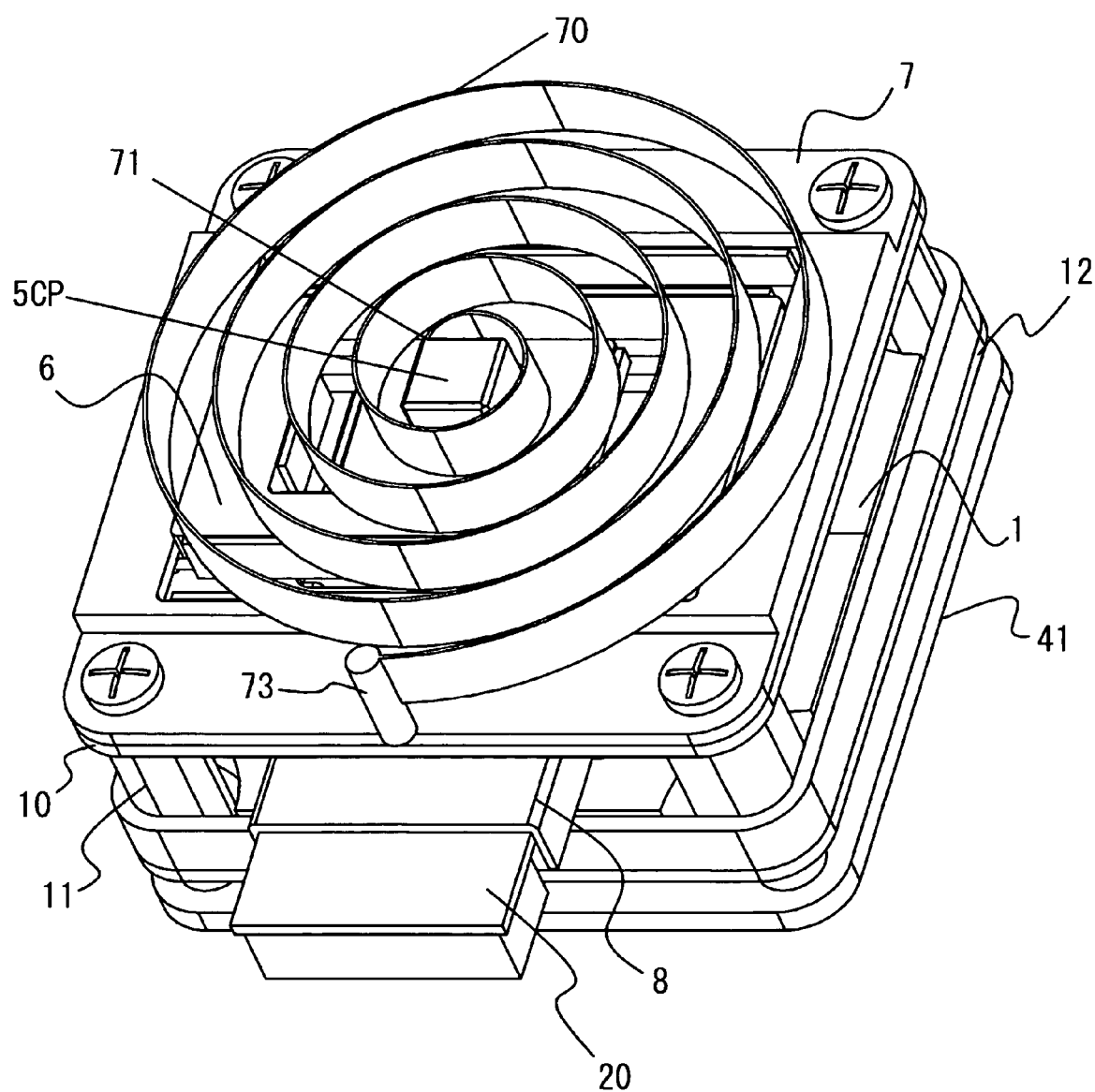
FIG. 10 is a perspective view of an actuator in accordance with a third embodiment of the present invention.
Figure 11:
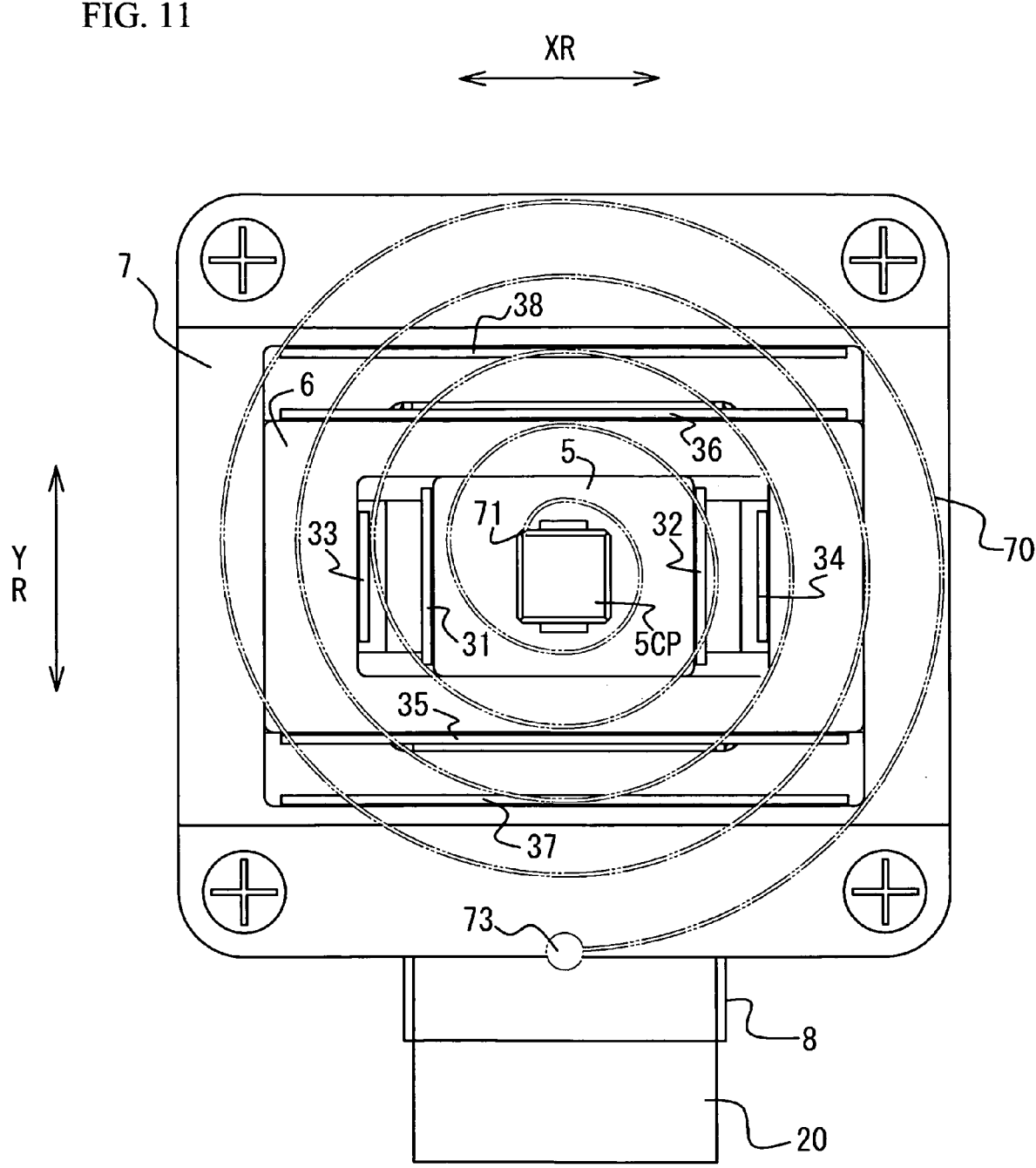
FIG. 11 is a plain view of the actuator in accordance with the third embodiment of the present invention.

FIGS. 10 and 11 show an actuator in accordance with a third embodiment of the present invention. FIG. 10 is a perspective view of the actuator in accordance with the third embodiment of the present invention. FIG. 11 is a plain view of the actuator in accordance with the third embodiment of the present invention.

The actuator in accordance with the third embodiment of the present invention includes a spring member 70. The spring member 70 is a clockwork-type so as to return the moving piece 5 to an original position. A first end 71 of the spring member 70 is secured to the head portion 5CP of the moving piece 5, and a second end 73 is secured on the second guide member 7. The moving piece 5 is capable of moving in an XR range in the X direction and in a YR range in the Y direction. If the moving piece 5 moves to the edge and does not return, the operator cannot operate the actuator in a comfortable manner.

The actuator in accordance with the third embodiment of the present invention is configured so that the spring member 70 may make the moving piece 5 return to the original position. (The original position corresponds to center points in the X direction and Y direction in accordance with the third embodiment of the present invention.) With the above-mentioned configuration, even if the actuator is finished using when the moving piece 5 has moved to the edge, the moving piece 5 returns to the original position next time the actuator is used, and it is thus possible to use the actuator in a comfortable manner.

The spring member 70 is illustrated in a dashed line in FIG. 11 so as to see the actuator under the spring member 70. The actuator in accordance with the third embodiment of the present invention preferably includes the magnets 31 through 38 provided for the hit prevention mechanism as in the first embodiment of the present invention.

The actuator in accordance with the first embodiment of the present invention as shown in FIGS. 4 and 5A through 5C has been described that the actuator includes the hit prevention mechanism. With respect to the magnets 31 through 38 facing each other in pairs, if the repulsive force is enhanced to keep a balance between two pairs of the magnets arranged in one direction, it is possible to move the moving piece 5 to the center. That is to say, a first repulsive force and a second repulsive force are enhanced. The first repulsive force is generated between the magnets 31 and 33 in the X-axial direction and the second repulsive force is generated between the magnets 32 and 34 in the Y-axial direction. The moving piece 5 can be moved to the center in the X-axial direction, by keeping a balance between the first repulsive force and the second repulsive force. The moving piece can be moved to the center in the Y-axial direction in the same manner. Thus, the moving piece 5 can return to the original position by controlling the magnetic attraction of the magnets 31 through 38.

The magnets 31 through 38 can be considered to be magnetic members provided for returning to the original position. The electromagnets are employed when the magnets are used for the hit prevention and for returning the original position. As in the above-mentioned embodiments, in the case where the electromagnets are employed, the actuator is connected to the driver unit 53 to control the electromagnets (See FIG. 7).

Fourth Embodiment

Figure 12A:
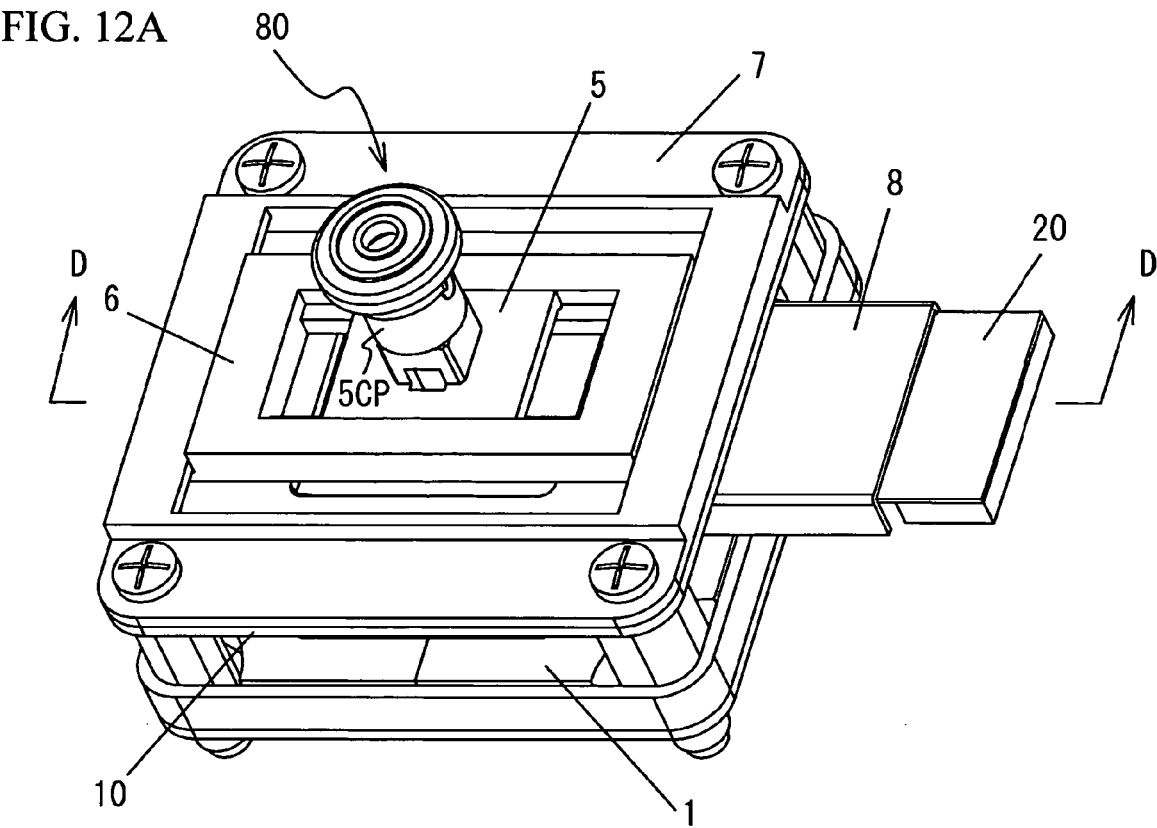
FIG. 12A is a perspective view of an actuator in accordance with a fourth embodiment of the present invention.
Figure 12B:
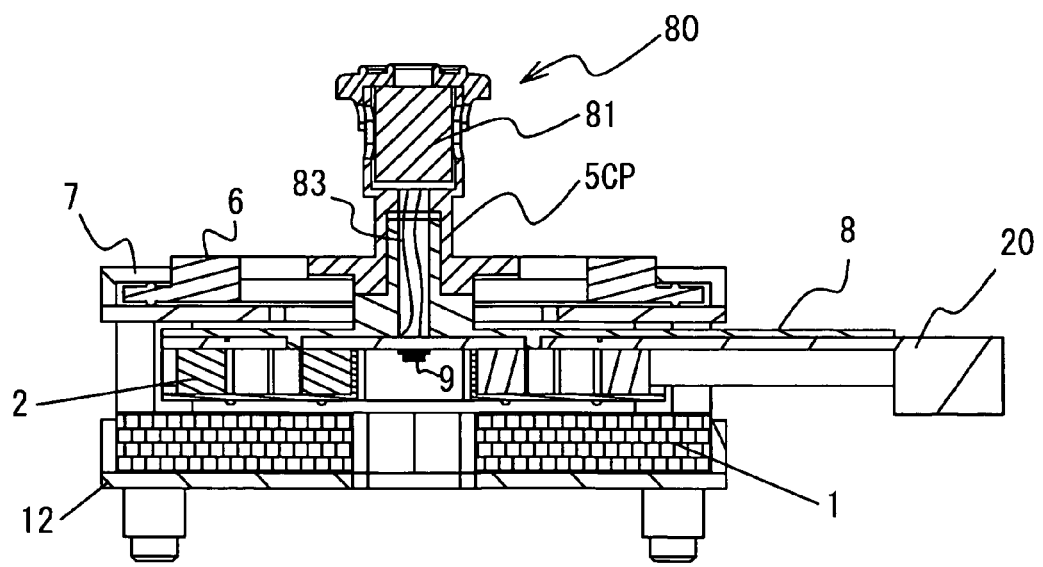
FIG. 12B is a cross-sectional view taken along a line D-D shown in FIG. 12A.

FIG. 12 shows an actuator in accordance with a fourth embodiment of the present invention. FIG. 12A is a perspective view of the actuator in accordance with the fourth embodiment of the present invention. FIG. 12B is a cross-sectional view taken along a line D-D shown in FIG. 12A. The actuator in accordance with the fourth embodiment of the present invention includes a thermal conduction portion 80. The thermal conduction portion 80 is provided on the head portion 5CP of the moving piece 5. A thermal conduction member 81 such as a heater, a peltiert element or the like is embedded in the thermal conduction portion 80. Referring to FIG. 12B, the thermal conduction member 81 is connected to the circuit board 30 on the slider 20 through a lead wire 83 (See FIG. 6B).

In the case where the heater is employed in the thermal conduction member 81, it is possible to induce a fever to a part where the operator touches. In the case where the peltiert element is employed, it is possible to cool down the part. In other words, the thermal conduction portion 80 is provided so as to give a feeling of heat including heat dissipation and heat absorption. The actuator having the thermal conduction portion 80 provided in the moving piece 5 is capable of conveying various pieces of information through heat changes. For example, in the case where the actuator in accordance with the fourth embodiment of the present invention is incorporated into the mouse connected to the computer, if a pointer points an image of ice on the computer display, it is possible to provide the operator with a feeling of coldness. In the same manner, in the case where the heater is employed, it is possible to provide the operator with a feeling of hotness. The thermal conduction member 81 having functions of heat dissipation and heat absorption may be embedded in the thermal conduction member 80. It is possible to control the thermal conduction member 81, by connecting the actuator with the driver unit 53 (See FIG. 7).

Figure 13A:
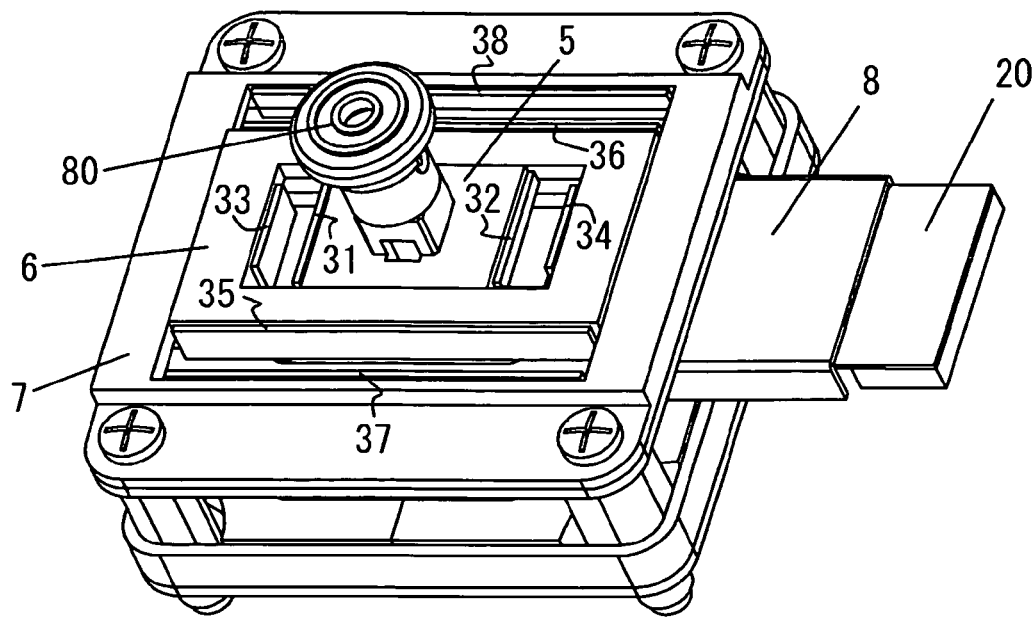
FIGS. 13A and 13B show two variations of the actuator in accordance with the fourth embodiment of the present invention.
Figure 13B:
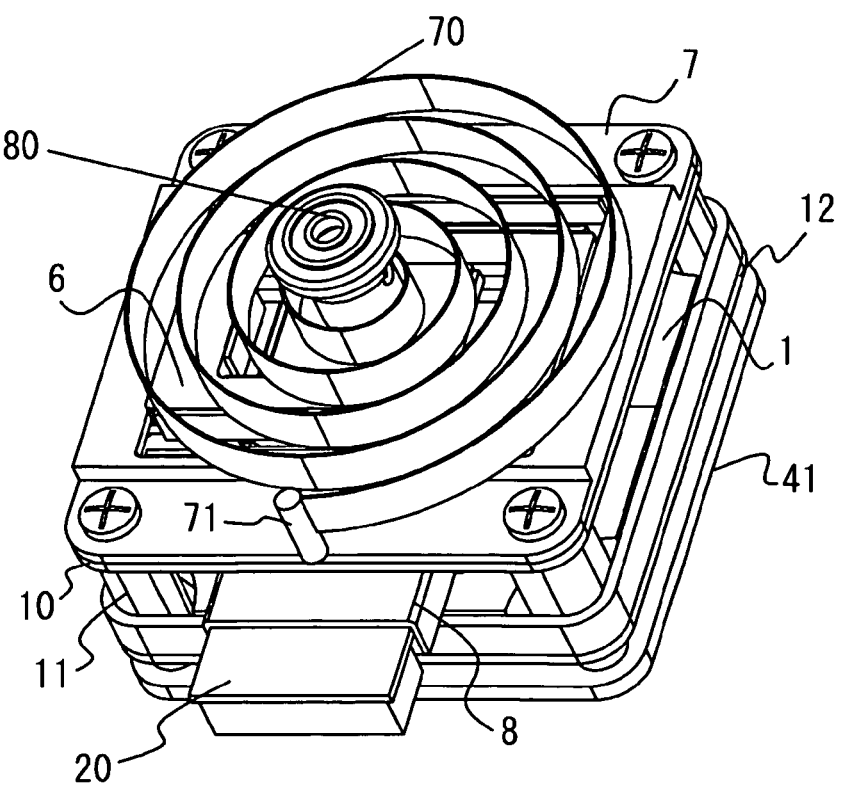

FIGS. 13A and 13B show two variations of the actuator in accordance with the fourth embodiment of the present invention. The actuator shown in FIG. 13A includes the thermal conduction portion 80 and the magnets 31 through 38. The magnets 31 through 38 have been described in the first embodiment of the present invention. The actuator is thus capable of preventing the hitting and is capable of giving the feeling of heat.

The actuator shown in FIG. 13B includes the spring member 70 used for returning to the original position. The spring member 70 has been described in the third embodiment of the present invention. Therefore, the actuator shown in FIG. 13B is a preferable one, and is capable of giving the feeling of heat and making the moving piece 5 return to the original position. Preferably, the actuator shown in FIG. 13B is configured to include the magnets 31 through 38 so as to prevent the hitting.

In the above-mentioned embodiments, the description has been given of the case where the slider of the actuator is driven by applying the current to the coil. In other words, the description has been given of the case where the actuator is driven passively by the signals of the computer. However, the actuator in accordance with the fourth embodiment of the present invention is not limited to the above-mentioned usage. The operator places a finger thereof on the moving piece to move the moving piece, and then the current is generated in the coil by electromagnetic induction caused resulting from the relative movement of the coil and magnet that face each other. This generated current may be used as the input device that gives instructions to the computer.

The present invention is not limited to the above-mentioned embodiments, and other embodiments, variations and modifications may be made without departing from the scope of the present invention.

The present invention is based on Japanese Patent Application No. 2004-026202 filed on Feb. 3, 2004, the entire disclosure of which is hereby incorporated by reference.

What is claimed is:

1. An actuator comprising:

magnets arranged on a plane on a plane;

coils respectively arranged to face the magnets and move relatively with facing the magnets when a current is applied thereto;

a moving member connected to either the magnets or coils;

a guide member that guides the moving member to move in a given two-dimensional range; and a hit prevention mechanism to prevent the moving member from hitting a movable limit in the given two-dimensional range, wherein:

the guide member guides the moving member in first and second axial directions perpendicular to each other, the hit prevention mechanism is provided for each of the first and second axial directions, and is further provided in diagonal directions of the given two-dimensional range different from the first and second axial directions, and the hit prevention mechanism provided in the diagonal directions preventing the moving members from the hitting the movable limit due to diagonal movements of the moving member in the given two-dimensional range.

2. The actuator as claimed in claim 1, wherein the hit prevention mechanism comprises at least a pair of magnets that generate a magnetic repulsive force when coming close to each other, the hit prevention mechanism being arranged to face the moving member and the movable limit.

3. The actuator as claimed in claim 1, wherein the moving member includes a moving piece touched by an operator and engaged with the guide member.

4. The actuator as claimed in claim 1, wherein the magnets comprise permanent magnets or electromagnets.

* * * * *

UNITED STATES PATENT AND TRADEMARK OFFICE
CERTIFICATE OF CORRECTION

PATENT NO. : 7,663,271 B2
APPLICATION NO. : 11/047987
DATED : February 16, 2010
INVENTOR(S) : Shinichiro Akieda et al.

It is certified that error appears in the above-identified patent and that said Letters Patent is hereby corrected as shown below:

Cover page, in the Abstract, item (57), line 1, delete "on a", second occurrence;

Cover page, in the Abstract, item (57), line 2, delete "plane";

Claim 1, Col. 12, line 12, delete "on a plane", second occurrence.

Signed and Sealed this

Fourth Day of May, 2010

David J. Kappos
*Director of the United States Patent and Trademark Office*